(12) United States Patent
Callaway

(10) Patent No.: US 12,716,499 B2
(45) Date of Patent: Aug. 25, 2026

(54) CARTRIDGE SEAL

(71) Applicant: Ergoseal, Inc., Carol Stream, IL (US)

(72) Inventor: Bryan Callaway, Carol Stream, IL (US)

(73) Assignee: ERGOSEAL, INC., Carol Stream, IL (US)

( * ) Notice: Subject to any disclaimer, the term of this patent is extended or adjusted under 35 U.S.C. 154(b) by 0 days.

(21) Appl. No.: 19/170,597

(22) Filed: Apr. 4, 2025

(65) Prior Publication Data

US 2025/0314302 A1 Oct. 9, 2025

Related U.S. Application Data

(60) Provisional application No. 63/574,963, filed on Apr. 5, 2024.

(51) Int. Cl.
*F16J 15/32* (2016.01)
*F16J 15/3256* (2016.01)

(52) U.S. Cl.
CPC ................................ *F16J 15/3256* (2013.01)

(58) Field of Classification Search
CPC ...... F16J 15/3256; F16J 15/34; F16J 15/3412; F16J 15/3428; F16J 15/3452
See application file for complete search history.

(56) References Cited

U.S. PATENT DOCUMENTS

| | | | | |
|---|---|---|---|---|
| 4,538,820 A * | 9/1985 | Duffee | ................. | F16J 15/3464 277/398 |
| 5,558,342 A * | 9/1996 | Sedy | .................... | F16J 15/3464 277/390 |
| 2015/0198172 A1* | 7/2015 | Hermmen, Jr. | ....... | F04D 29/126 277/361 |
| 2015/0337674 A1* | 11/2015 | Sonokawa | ................ | F02C 7/28 415/173.3 |
| 2021/0381603 A1* | 12/2021 | Azibert | .................. | F16J 15/344 |

* cited by examiner

*Primary Examiner* — Christine M Mills
*Assistant Examiner* — L. Susmitha Koneru
(74) *Attorney, Agent, or Firm* — Leydig, Voit & Mayer, Ltd.

(57) ABSTRACT

A cartridge seal assembly includes a rotatable seal ring and a non-rotatable seal ring forming a mechanical face seal. A plurality of resilient elements disposed in a housing between a stop surface and the non-rotatable seal ring provide a biasing force to urge the non-rotatable seal ring towards the rotatable seal ring. The non-rotatable seal ring includes an inner axial side opposite the annular non-rotatable seal face that forms a plurality of slots that are arranged peripherally around the inner axial side between adjacent pairs of nubs disposed on and protruding from the inner axial side in a direction away from the annular non-rotatable seal face; wherein each of the plurality of slots abuttingly receives therein a closed end of a respective one of the plurality of resilient elements to provide an anti-rotation function between the housing and the non-rotatable seal ring.

19 Claims, 5 Drawing Sheets

CARTRIDGE SEAL

CROSS-REFERENCE TO RELATED APPLICATIONS

The instant application claims priority of U.S. Provisional Patent Application No. 63/574,963, filed on Apr. 5, 2024, which is incorporated herein in its entirety by reference.

FIELD OF THE DISCLOSURE

The present disclosure relates to mechanical face seals and, more particularly, to cartridge seals.

BACKGROUND OF THE INVENTION

A cartridge seal is an arrangement of seal components that provide a sliding seal between a rotating component such as a shaft and a stationary component. Sliding seals usually include a shaft sleeve disposed on a rotating shaft, and a housing that affixes to the stationary component. A rotating seal member disposed on the shaft sealably engages a non-rotating seal member disposed on the housing and provide a seal there between. Known seal types include bellows and spring-type seals. For seal performance and service life, proper engagement and alignment is required between the various seal arrangement components.

BRIEF DESCRIPTION OF THE SEVERAL VIEWS OF THE DRAWING(S)

DETAILED DESCRIPTION OF THE INVENTION

Figure 1:
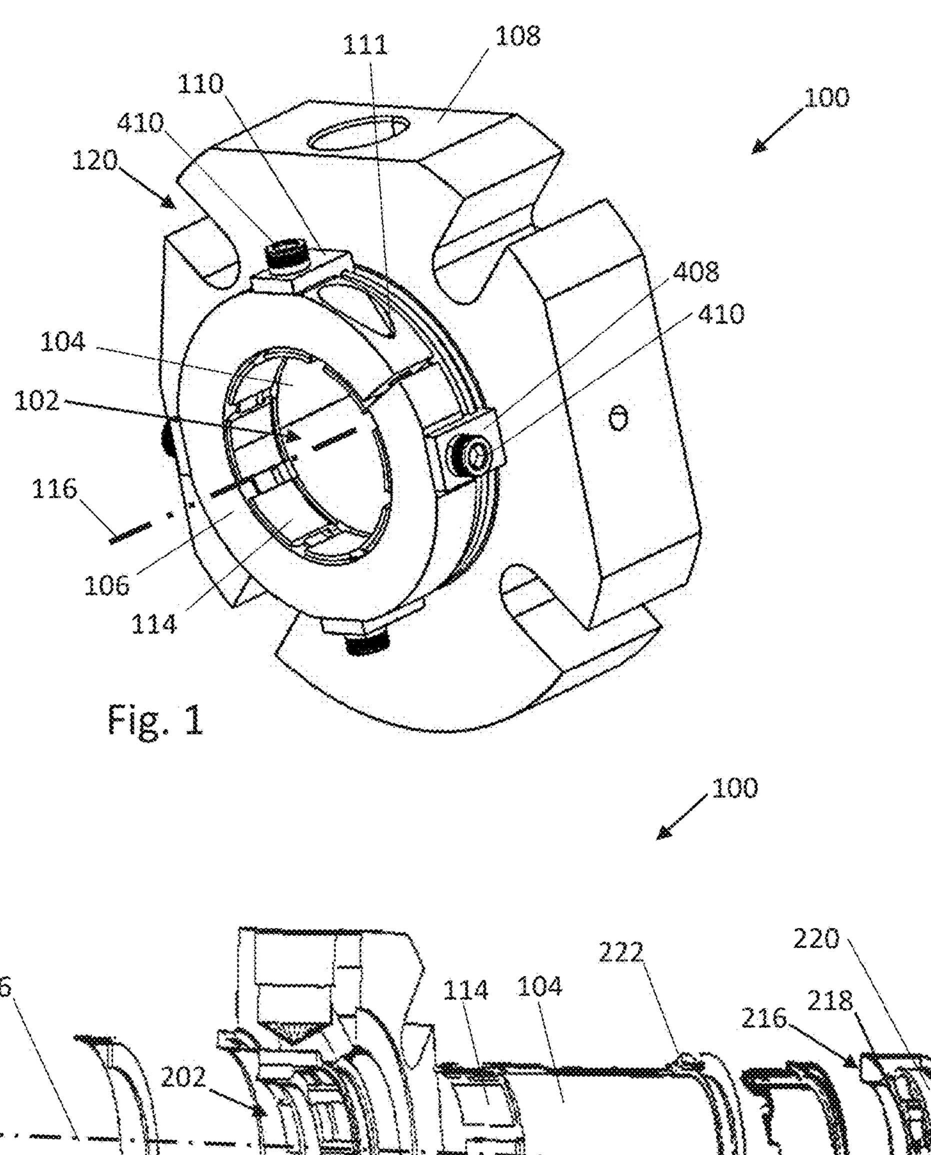
FIG. 1 is an outline view of a cartridge seal in accordance with the disclosure.

FIG. 1 is an outline view of a cartridge seal 100 in accordance with the disclosure. The cartridge seal 100 includes a shaft bore 102 defined within a shaft sleeve 104 (also shown in FIG. 6) that extends through a housing 108. A clamping collar 106 is secured to an end of the shaft sleeve 104. The cartridge seal 100 may be pre-assembled before being installed on a shaft (not shown), and the housing 108 mounted onto a stationary structure (not shown) through fasteners (not shown) extending through bores 120 for a particular application. To maintain alignment of the various components and proper gaps during transport, the cartridge seal 100 as shown includes assembly and shipping retainers, which are removed once the seal has been installed and is ready for operation. In the illustrated embodiment, the clamping collar 106 is secured to the housing 108 using clips 110 that are fastened to the clamping collar 106 using fasteners 410. The clips 110 extend from brackets 408 that engage a ridge on the housing 108 to center and set a proper distance of the collar 106 to the housing 108.

Figure 2:
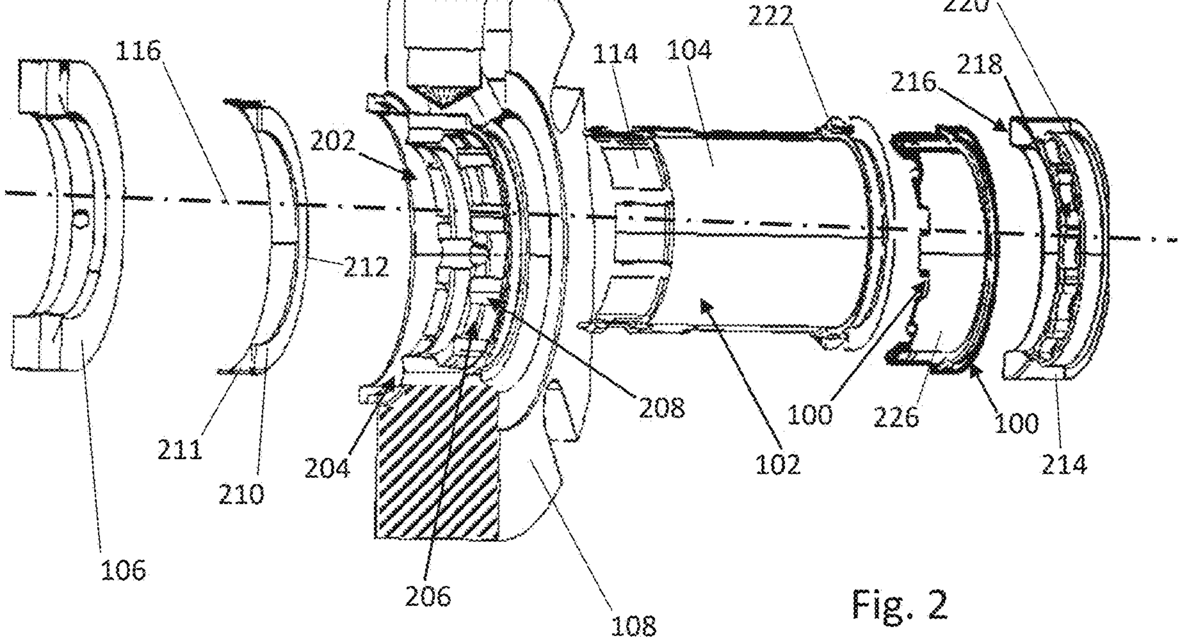
FIG. 2 is an exploded view of the cartridge seal of FIG. 1.
Figure 3:
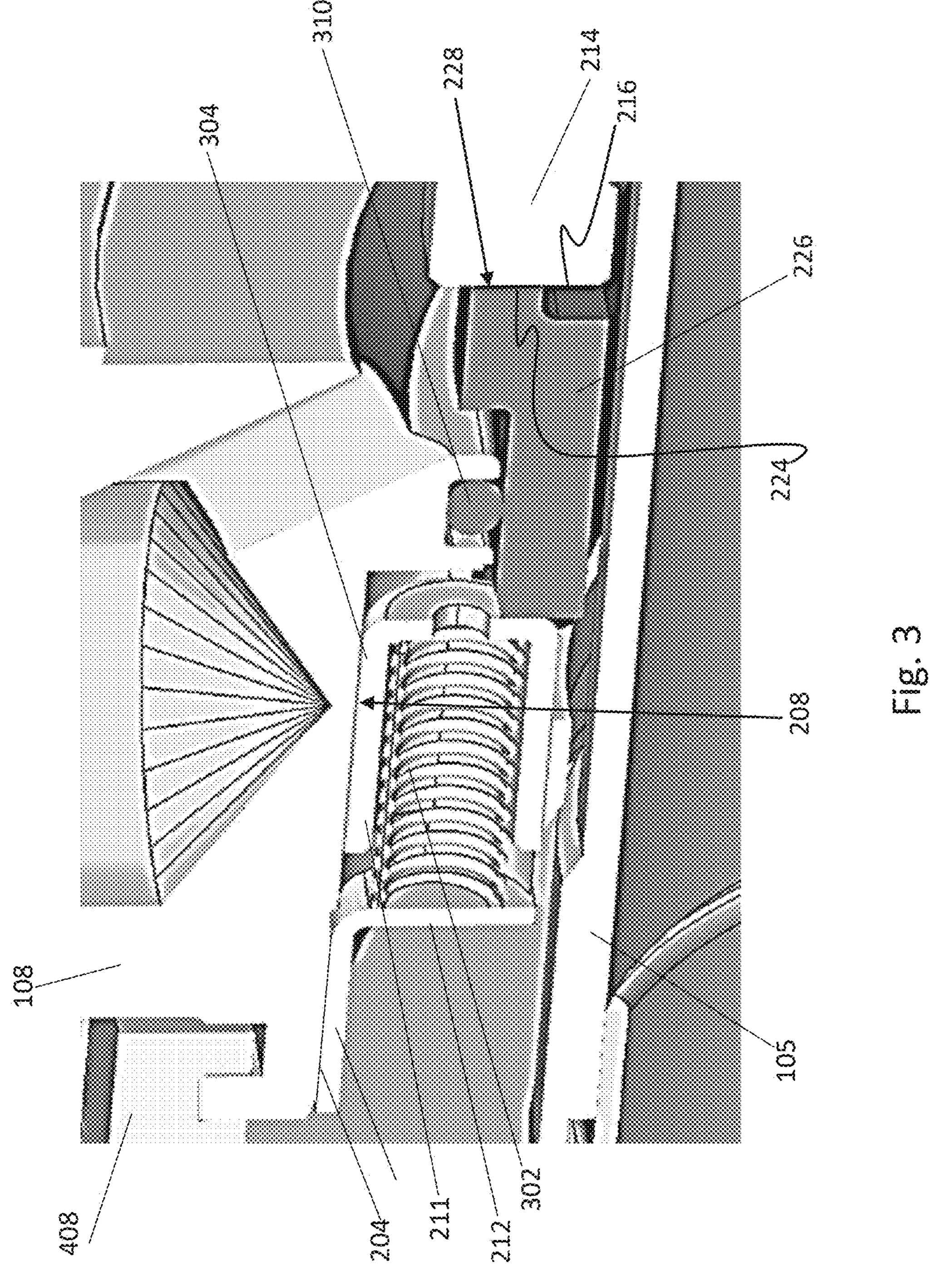
FIG. 3 is a section view of a portion of the cartridge seal of FIG. 1.

An exploded view of the cartridge seal 100 showing its major components is shown in FIG. 2, and a cross section through a portion thereof is shown in FIG. 3. In reference to these figures, it can be seen that the cartridge seal 100 includes the housing 108 that defines a central opening 202. In this embodiment, the central opening 202 defines a locking bore portion 204, disposed adjacent an end portion of the housing 108, and a receiver bore portion 206, which is disposed adjacent the locking bore portion 204. The receiver bore portion 206 includes a plurality of receiver bores 208 arranged around its inner periphery. In the illustrated embodiment, the receiver bores 208 are arranged symmetrically around the periphery but other configurations can also be used. Each of the plurality of receiver bores 208 is a bore that extends parallel to the centreline 116 at an offset distance therefrom along the body of the housing 108. Each of the plurality of receiver bores 208 has a partially blocked blind end on an outer side of the cartridge (towards the right in FIGS. 2 and 3 in the orientation shown), and an open on an inner side of the cartridge. In the illustrated embodiment, the receiver bores 208 are open towards the left side of the cartridge as shown, which permits assembly of components therein from that direction, but the receiver bores 208 could also be formed to be open from the right side of the cartridge as shown, depending on the sealing arrangement.

In this embodiment, a locking ring 210 is disposed in the locking bore portion 204 of the housing. The locking ring 210 has an L shaped cross section that includes a locking portion 211 that frictionally engages the inner surface of the locking bore portion 204, and an annular flange 212 that faces the plurality of receiver bores 208 and blocks them in an axial direction along the centerline 116. An interior of the receiver bores 208 forms a generally cylindrical chamber in each bore that is at least partially circumferentially bound by the housing 108, is at least partially blocked on an outer end, and is blocked on an inner end by the annular flange 212. In another embodiment, the locking ring 210 may be reversed, and a floating clearance seal incorporated in the cavity between the locking ring and the springs, with the springs pressing the floating clearance seal against the locking ring. In yet another embodiment, the locking ring may be replaced by a lip seal. In yet another embodiment, the locking ring may be replaced by a secondary mechanical seal. Other means of providing a stop for the springs in the bores 206 with or without a locking bore 202 may also fall within the scope of this invention.

The rotatable sealing ring, or rotating seal member 214, contacts a non-rotating seal face 224 to form a mechanical face seal 228 (see FIG. 3). The non-rotating seal face 224 is formed on a non-rotatable seal ring, or non-rotating seal member 226. The non-rotating seal member 226 is disposed around a portion of the shaft sleeve 104 and is rotatably engaged with the housing 108 such that it remains stationary along with the housing 108 when the shaft and the shaft sleeve 104 is rotating and, with it, the rotating seal member 214 is also rotating. The sliding mechanical face seal 228 is created at the rotating interface between the rotating seal face 216 and the non-rotating seal face 224.

For retaining the non-rotating seal member 226 in rotational engagement with the housing 108, and for also allowing sliding engagement of the non-rotating seal member 226 while also providing a biasing force acting to compress the mechanical face seal 228, a barrel arrangement with springs is provided. In reference to FIG. 3, it can be seen that a plurality (one shown in section) of springs 302 are disposed, one each, within the receiver bores 208. Each spring 302 is disposed within a hollow cup 304 that is slidably disposed within the respective receiver bore 208 between one end of the spring, and the non-rotating seal member 226. The cup 304 abuts an inner end of the non-rotating seal member 226. The inner end of the non-rotating seal member 226 forms axially extending slots 306 (also see FIGS. 8 and 9) that can be arranged peripherally around the ring and disposed between nubs 308. Each slot 306 abuttingly receives therein a closed end 312 of a cup 304.

Figure 8:
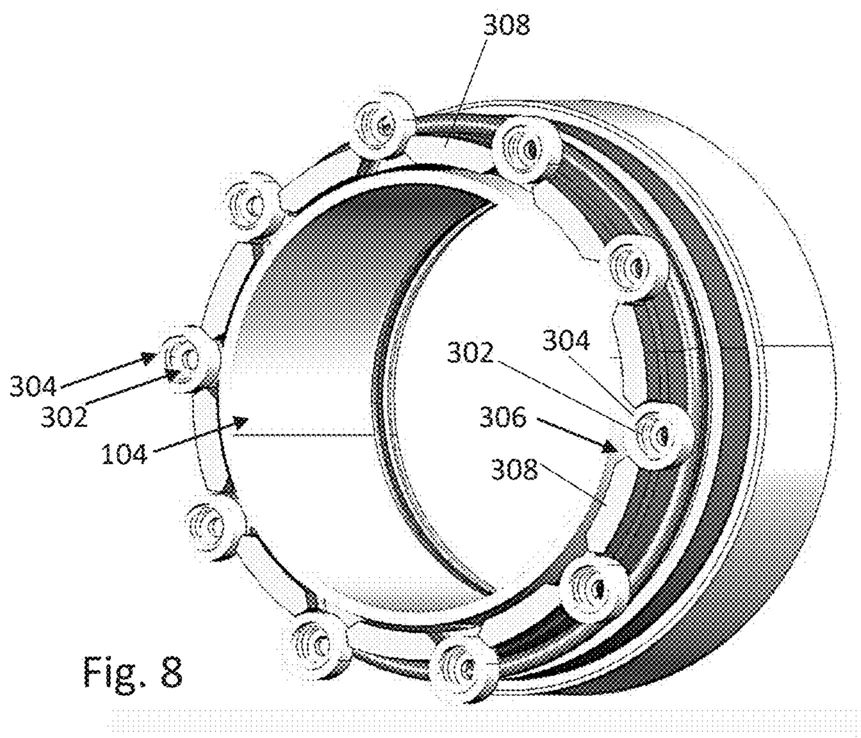
FIG. 8 is a section view of the cartridge seal of FIG. 1 at an area adjacent a non-rotating seal member.

The closed end of the cup is biased against the slot 306 by the respective spring 302, the other end of which pushes against the annular flange 212 of the locking ring 210 in this embodiment, as shown in FIG. 3, or against any number of other features as described in paragraph 14. The closed end 312 of the cup 304 may also include an opening to provide fluid pressure equalization during operation. A secondary seal 310 provides a non-rotating but sliding seal interface between the housing 108 and an outer portion of the non-rotating seal member 226. During operation, a plurality of spring/cup tensor arrangements, as shown in FIG. 8, apply a net biasing force around a periphery of the non-rotating seal member 226 onto the mechanical face seal 228. The mounting of the non-rotating seal member 226 is sealable and slidable relative to the housing 108 such that wear at the mechanical face seal 228 interface or axial motion between the shaft and the housing do not compromise the sealing function between the rotating and non-rotating seal members 214 and 226.

The cartridge seal 100 further includes a rotating seal member 214, which includes a rotating seal face 216 having an annular shape and facing towards the inner side of the cartridge seal 100. The rotating seal face 216 has a planar annular shape that extends perpendicularly and concentrically relative to the centerline 116. The rotating seal member 214 is generally ring shaped and includes a central opening through which a portion of the shaft sleeve 104 passes. A contoured driven portion 218 is formed along a portion of a radially inner portion of the rotating seal member 214 adjacent the rotating seal face 216. A sealing bore portion 220 has a smooth inner cylindrical surface and is disposed adjacent the contoured drive portion 218 along the central opening of the rotating seal member 214. The contoured driven portion 218, which is best shown in FIG. 7, drivably engages a corresponding drive portion 222 formed at an outer end of the shaft sleeve 104 such that, when the shaft sleeve 104 rotates with the shaft (not shown), the rotating seal member 214 also rotates along with the sleeve.

During assembly, the rotating shaft sleeve 104 is insertable through the central opening of the rotating seal member 214 until a raised flange portion 230 abuts a stop surface 232 of the shaft sleeve 104. The stop surface 232 is an annular surface disposed peripherally around an outer portion of the shaft sleeve 104 and adjacent a channel 234 formed between the stop surface 232 and an end surface 236. The channel 234 accommodates a radial seal that provides a sealing interface between the shaft sleeve 104 and the rotating seal member 214.

Figure 6:
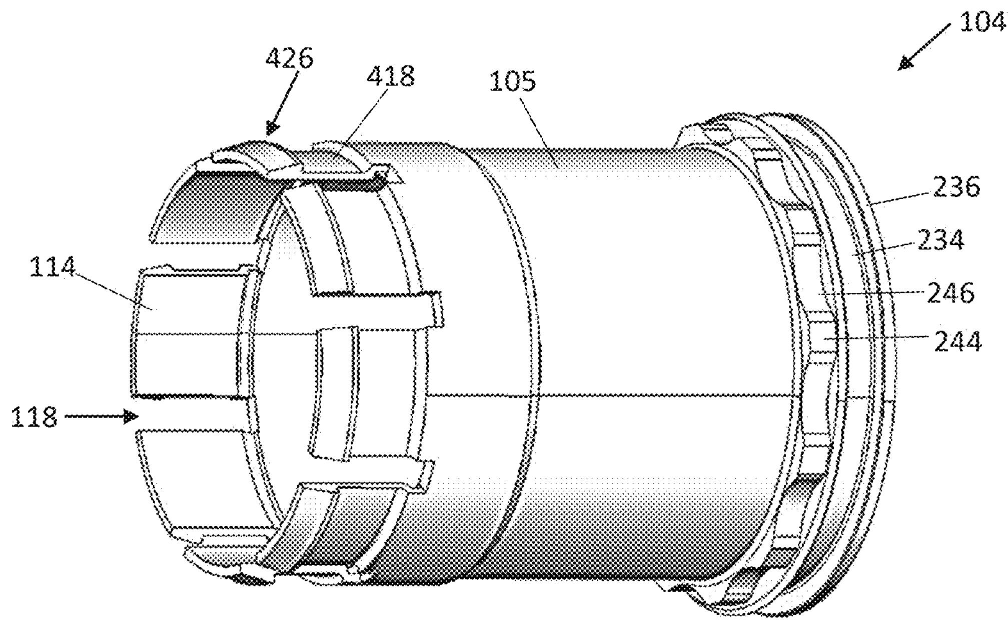
FIG. 6 is an outline view of a shaft sleeve of the cartridge seal of FIG. 1, shown removed from the seal assembly for illustration.
Figure 7:
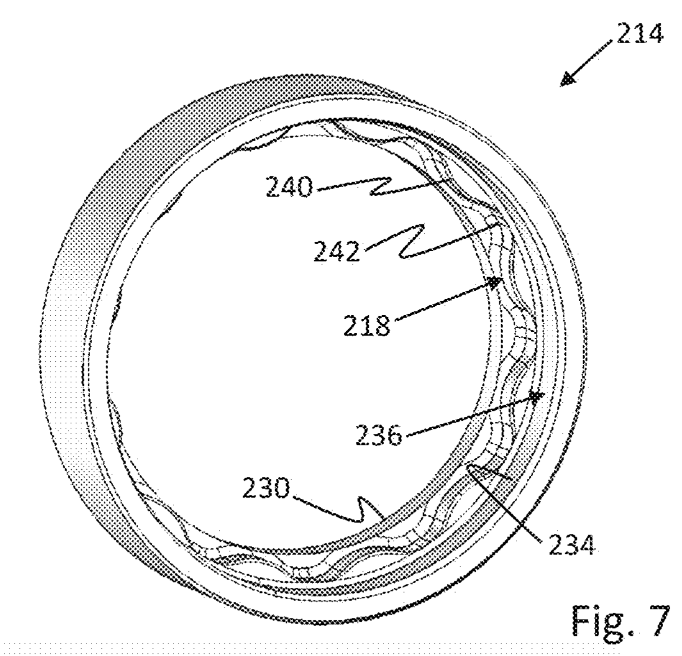
FIG. 7 is an outline view of a rotating seal carrier of the cartridge seal of FIG. 1, shown removed from the seal assembly for illustration.

As previously described, and in reference to FIGS. 6 and 7, the rotating seal member 214 includes a contoured driven portion 218. The contoured driven portion 218 includes alternatingly concave and convex surfaces, the inner contour of which radially undulates inwardly and outwardly and includes a series of repeating arches peripherally around the inner portion of the rotating seal member 214. The contour includes convex peaks 240, which extend radially inwardly, and concave valleys 242, which extend radially outwardly, in alternating fashion. The contoured driven portion 218 meshes or drivingly engages the contoured drive portion 222 formed on the shaft sleeve 104. The drive portion 222 generally matingly matches the shape of the contoured driven portion 218 and includes alternatingly concave and convex surfaces, the inner contour of which radially undulates inwardly and outwardly peripherally around the outer portion of the shaft sleeve 104. The contour includes convex peaks 244, which extend radially outwardly, and concave valleys 246, which extend radially inwardly, in alternating fashion.

When mounting the shaft sleeve 104 to the shaft (not shown), it is important to maintain proper concentricity of the sleeve relative to the shaft, and also to avoid displacement of the sleeve on the shaft during operation, which may affect a quality of the mechanical face seal provided by the cartridge seal 100. In the illustrated embodiment, the shaft sleeve 104 includes a plurality of tabs 114 extending parallel to a bore centerline 116 of the shaft bore 102. In the illustrated embodiment, eight tabs 114 are shown, which are separated by gaps 118 (see FIG. 6), but any other number of tabs can be used. Each of the plurality of tabs 114 cantilevers away from an end of the sleeve 104 and is resilient such that it can deflect and abut an outer surface of the shaft (not shown) when the clamping collar 106 is installed. The clamping collar 106, which in this embodiment is shown as a single-piece C-collar, includes a fastener installed in a threaded bore 122 that closes and tightens the collar 106 to provide a clamping force that is directed radially inwardly to elastically deform the tabs 144 and push them against the shaft (not shown) to retain the shaft sleeve 104 thereon.

Figure 4:
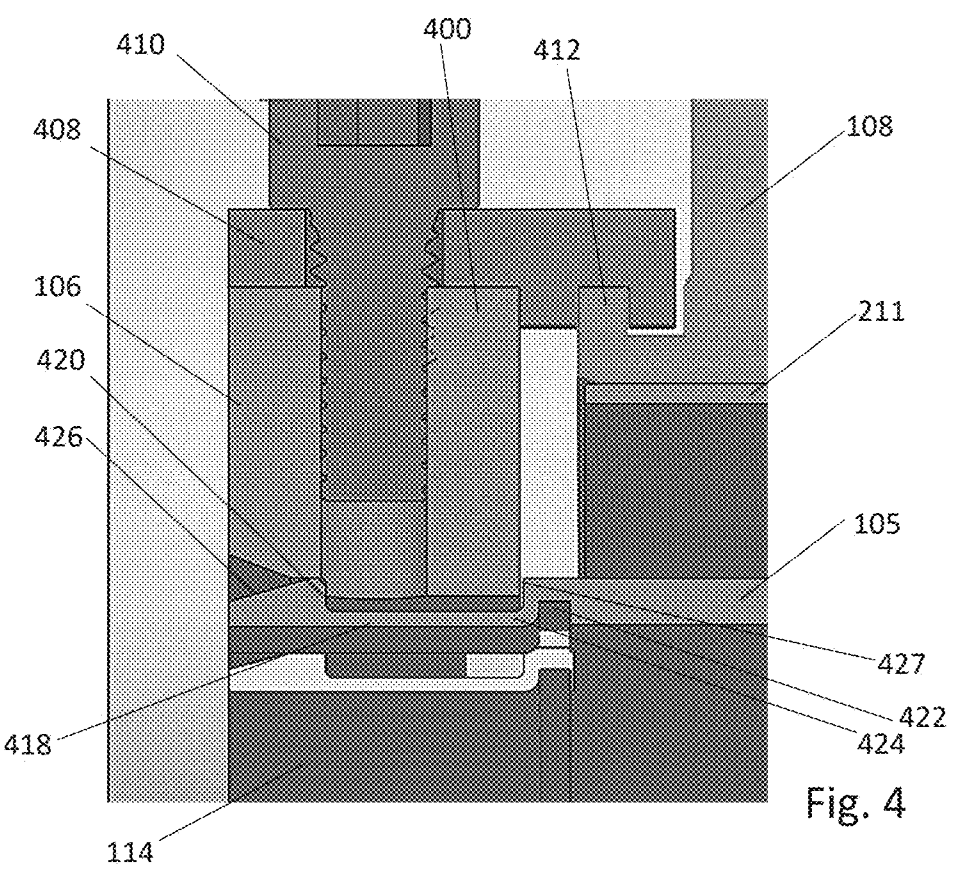
FIG. 4 is an enlarged detail view of the section of FIG. 3.
Figure 5:
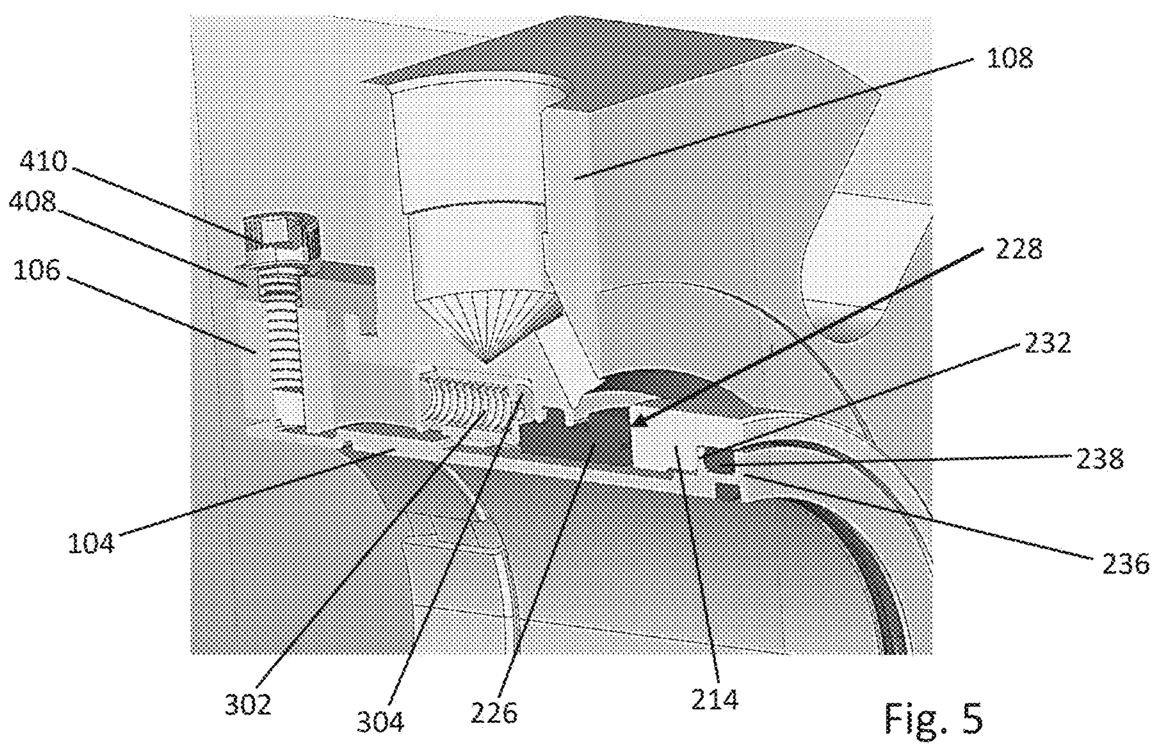
FIG. 5 is an enlarged detail view of the section of FIG. 3.

In this embodiment, the collar 106 has a generally circular or ring-shaped body 400 and, as shown in FIG. 4, includes a chamfer surface 402 along an inner edge thereof that faces away from the cartridge seal assembly 100. The chamfer surface 402 is adjacent a resting surface 404 that is generally cylindrical and disposed along an inner periphery of the collar 106. A reduced diameter surface 406 is disposed adjacent the resting surface 404 and extends along a remaining inner portion of the collar 106.

In other embodiments, the collar 106 may take other general forms such as being split in half, with two screws, enabling assembly without having to pass over the tabs at the end of the sleeve; being hinged, also facilitating passage over the tabs at the end of the sleeve but requiring only one screw, and other known configurations.

When assembled, the collar 106 overlaps the tabs 114 of the shaft sleeve 104 and, when the collar is tightened using a screw 111 (FIG. 1), it pushes the tabs 114 inwardly to secure the shaft sleeve 104 onto a shaft (not shown). To complete installation of the cartridge 100, the housing 108 is bolted onto a non-rotating component (not shown). To maintain alignment and clearances between the various internal components of the cartridge 100 prior to installation, locking brackets 408 are used, as shown in FIG. 1 and in the enlarged detail section view of FIG. 4. The locking brackets 408 are fastened to the collar 106 and engage a ledge 412 of the housing 108. The ledge 412 extends as a circular wall around the housing 108 away from the centerline 116. The ledge 412 is disposed within a notch 414 formed in each bracket 408 and thus engages the brackets 408 to set a radial distance for the brackets 408 from the centerline 116, as well as set an axial distance of the brackets 408 from the housing 108. The setting of the axial and radial position of the brackets 408 also precisely locates the collar 106 and the shaft sleeve 104 relative to the housing 108 while the cartridge 100 has not yet been installed between a shaft and non-rotating components at the intended application site. After installation of the cartridge 100 at its intended service site, the brackets 408 and fasteners 410 are removed and the collar 106 is tightened.

An enlarged detail of the interface between the collar 106 and one of the tabs 114 is show in FIG. 4. In reference to this figure, it can be seen that in this embodiment the tabs 114 have a geometry that includes a leading chamfered edge 426 formed at the end of a reduced thickness portion 418. This enables installation of the one-piece collar over the end of the sleeve; in designs in which the collar is split or hinged, as described in paragraph 23, or if a chamfered installation tool is used to facilitate mounting of the collar, the chamfer may be reduced or eliminated. The tab includes a back-stop surface 420, which interferes with the reduced diameter surface 406 of the collar 106. Another axial stop 427 is provided at the "right" side of the collar. These stops locate the collar axially relative to the sleeve, facilitating a proper relative axial position between the housing 108 and the sleeve 105. In some embodiments, the spring load between the seal faces may be sufficient to drive the housing in one direction, so that only one of these stops is necessary. The bending of the tabs 114 is elastic or resilient, which means that the tabs 114 can resume their original shape when the collar 106 and the shaft (not shown) are removed. Features such as the undercut notch 422 may be provided to reduce the force necessary to close the tabs 418 against the shaft (not shown) and/or to increase the range through which the tabs may travel without plastic deformation while accommodating a relatively thick portion of the sleeve 105 adjacent to the tabs (which feature is desirable when a secondary seal such as a lip seal, outboard mechanical seal, or clearance bushing is provided where locking ring 211 is located in the present embodiment). A feature such as the radius 424 at the root of the tab may be provided to facilitate the mounting of the sleeve 105 on the shaft.

Figure 9:
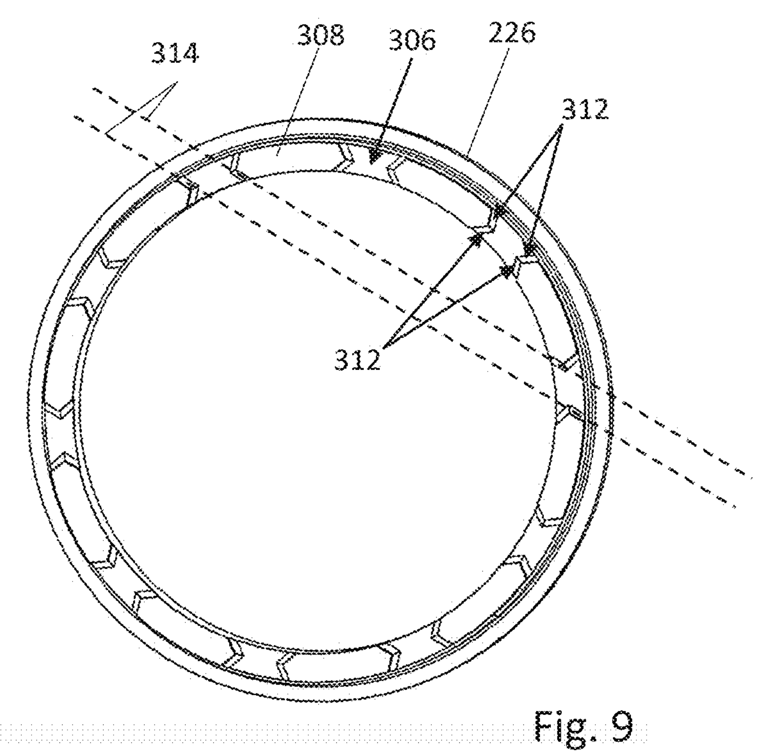
FIG. 9 is an outline view of an end of the non-rotating seal member in accordance with the disclosure.

A rear view of the non-rotating seal member 226 is shown in FIG. 9. In reference to this figure, it can be seen that the edges of the nubs 308 adjacent the slots 306 are comprised of converging edge faces 312 that form a chevron shape. This shape helps control a contact surface between the non-rotating seal member 226 and the cups 304 that are disposed therein during operation, by providing tangent planes rather than sharp edges for the cups 304 to contact the non-rotating seal member 225, thereby reducing contact stress. To form the nubs 308 and slots 306, in one embodiment, a disk cutter 314 may be used that is applied eccentrically along a chord relative to the non-rotating seal member 226 and cuts two peripherally across sections of the seal member at each pass, as shown by the dotted lines representing the cutter in FIG. 9. Thus, in a number of cuts equal to the number of slots, each defining two of the four faces on each of two slots, the entire slot arrangement is created.

All references, including publications, patent applications, and patents, cited herein, and especially the provisional application mentioned above, are hereby incorporated by reference to the same extent as if each reference were individually and specifically indicated to be incorporated by reference and were set forth in its entirety herein.

In one embodiment, the present disclosure describes a cartridge seal assembly, comprising: a shaft sleeve that rotatably extends through a housing, the shaft sleeve being adapted to be securable in co-rotating fashion onto a rotatable shaft, the housing being adapted to be securable onto a non-rotating machine component; a rotatable seal ring disposed in co-rotating fashion onto an end of the shaft sleeve, the rotatable seal ring being rotatable with the rotatable shaft and the shaft sleeve in unison during operation, wherein the rotatable seal ring includes an annular rotatable seal face; a non-rotatable seal ring being slidably and sealably disposed in the housing, the non-rotatable seal ring including an annular non-rotatable seal face that is biased in sealing and sliding contact with the annular rotatable seal face during operation; a plurality of resilient elements disposed in the housing between a stop surface and the non-rotatable seal ring, wherein the plurality of resilient elements are disposed to provide a biasing force to urge the non-rotatable seal ring towards the rotatable seal ring to form a mechanical face seal between the annular rotatable and non-rotatable seal faces; wherein the non-rotatable seal ring includes an inner axial side opposite the annular non-rotatable seal face, the inner axial side forming a plurality of slots that are arranged peripherally around the inner axial side between adjacent pairs of nubs disposed on and protruding from the inner axial side in a direction away from the annular non-rotatable seal face; and wherein each of the plurality of slots abuttingly receives therein a closed end of a respective one of the plurality of resilient elements to provide an anti-rotation function between the housing and the non-rotatable seal ring.

In one embodiment, each of the nubs includes two peripherally disposed edges, each of the peripherally disposed edges including converging edge faces that form a chevron shape. In this embodiment, the converging edge faces present tangent planes for the closed end of the respective one of the plurality of resilient elements abuttingly received therein to reduce contact stresses there between.

In another embodiment, two slots disposed between respective nubs are generally aligned to accommodate a disk cutter that is applied eccentrically along a chord relative to the inner axial side of the non-rotatable seal ring to cut two peripherally across sections of the inner axial side at each pass during manufacture of the non-rotatable seal ring. In this embodiment, the housing defines a central opening that includes a locking bore portion disposed adjacent an end portion of the housing, and a receiver bore portion disposed adjacent the locking bore portion, wherein the receiver bore portion includes a plurality of receiver bores arranged around its inner periphery, each of the plurality of receiver bores containing one of the plurality of resilient elements. The plurality of receiver bores is arranged symmetrically around a periphery of the central opening of the housing, and wherein each of the plurality of receiver bores is a bore that extends parallel to a centerline of the central opening at an offset distance therefrom along a body of the housing. Each of the plurality of receiver bores has a partially blocked blind end on an outer side of the housing facing the non-rotatable seal ring, and wherein the resilient elements are disposed radially offset in a radially outward direction relative to the inner axial side.

In another embodiment, each of the plurality of resilient elements includes a spring that is at least partially disposed within a cup through an open end of the cup, the cup having a closed end that at least partially abuts the non-rotatable seal ring.

In another embodiment, each cup is slidably disposed within the housing. In this embodiment, the closed end of the cup includes an opening adapted to provide fluid pressure equalization during operation.

In another embodiment, the rotatable seal ring is generally ring shaped and includes a central opening through which a portion of the shaft sleeve passes. In this embodiment, a contoured driven portion is formed along a portion of a radially inner portion of the rotatable seal ring, the contoured driven portion drivably engaging a corresponding contoured drive portion formed along an outer periphery of the end of the shaft sleeve. The contoured driven portion includes alternatingly concave and convex surfaces such that an inner contour thereof radially undulates inwardly and outwardly and includes a series of repeating arches peripherally around an inner portion of the rotatable seal ring. The contoured driven portion includes convex peaks that extend radially inwardly and concave valleys that extend radially outwardly in alternating fashion.

In one embodiment, the contoured driven portion meshes or drivingly engages the contoured drive portion, and wherein the contoured drive portion generally matingly matches a shape of the contoured driven portion.

In another aspect, the disclosure describes a method for operating a cartridge seal assembly that is disposable between a rotatable shaft and a non-rotating machine component, the method comprising: providing a shaft sleeve on the rotatable shaft, the shaft sleeve rotatably extends through a housing mounted onto the non-rotating machine component, the shaft sleeve being adapted to be securable in co-rotating fashion onto the rotatable shaft; providing a rotatable seal ring disposed in co-rotating fashion onto an end of the shaft sleeve, the rotatable seal ring being rotatable with the rotatable shaft and the shaft sleeve in unison during operation, wherein the rotatable seal ring includes an annular rotatable seal face; providing a non-rotatable seal ring being slidably and sealably disposed in the housing, the non-rotatable seal ring including an annular non-rotatable seal face that is biased in sealing and sliding contact with the annular rotatable seal face during operation; providing a plurality of resilient elements disposed in the housing between a stop surface and the non-rotatable seal ring, wherein the plurality of resilient elements are disposed to provide a biasing force to urge the non-rotatable seal ring towards the rotatable seal ring to form a mechanical face seal between the annular rotatable and non-rotatable seal faces; wherein the non-rotatable seal ring includes an inner axial side opposite the annular non-rotatable seal face, the inner axial side forming a plurality of slots that are arranged peripherally around the inner axial side between adjacent pairs of nubs disposed on and protruding from the inner axial side in a direction away from the annular non-rotatable seal face; and wherein each of the plurality of slots abuttingly receives therein a closed end of a respective one of the plurality of resilient elements to provide an anti-rotation function between the housing and the non-rotatable seal ring.

In one embodiment, each of the nubs includes two peripherally disposed edges, each of the peripherally disposed edges including converging edge faces that form a chevron shape. The converging edge faces present tangent planes for the closed end of the respective one of the plurality of resilient elements abuttingly received therein to reduce contact stresses there between.

In one embodiment, two slots disposed between respective nubs are generally aligned to accommodate a disk cutter that is applied eccentrically along a chord relative to the inner axial side of the non-rotatable seal ring to cut two peripherally across sections of the inner axial side at each pass during manufacture of the non-rotatable seal ring.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

REFERENCES

100 cartridge seal
102 shaft bore
104 shaft sleeve
105 body
106 clamping collar
108 housing
110 clips
111 screw
114 tabs
116 bore centerline
118 gaps
120 bores
202 central opening
204 locking bore portion
206 receiver bore portion
208 receiver bore(s)
210 locking ring
211 locking portion
212 annular flange

214 rotating seal member
216 rotating seal face
218 contoured drive portion
220 sealing bore portion
222 drive portion
224 non-rotating seal face
226 non-rotating seal member
228 mechanical face seal
230 raised flange portion
232 stop surface
234 channel
236 end surface
238 radial seal
240 peaks
242 valleys
244 peaks
246 valleys
302 spring
304 cup
306 slots
308 nubs
310 radial seal
312 converging edge faces
314 cylindrical cutter
402 chamfer surface
404 resting surface
406 reduced diameter surface
408 locking brackets
410 fastener
412 ledge
414 notch
418 reduced thickness portion
420 back-stop surface
422 undercut notch
424 curved transition wall
426 leading chamfered edge
427 stop

What is claimed is:

1. A cartridge seal assembly, comprising:

a shaft sleeve that rotatably extends through a housing, the shaft sleeve being adapted to be securable in co-rotating fashion onto a rotatable shaft, the housing being adapted to be securable onto a non-rotating machine component;

a rotatable seal ring disposed in co-rotating fashion onto an end of the shaft sleeve, the rotatable seal ring being rotatable with the rotatable shaft and the shaft sleeve in unison during operation, wherein the rotatable seal ring includes an annular rotatable seal face;

a non-rotatable seal ring being slidably and sealably disposed in the housing, the non-rotatable seal ring including an annular non-rotatable seal face that is biased in sealing and sliding contact with the annular rotatable seal face during operation; and a plurality of resilient elements disposed in the housing between a stop surface and the non-rotatable seal ring, wherein the plurality of resilient elements are disposed to provide a biasing force to urge the non-rotatable seal ring towards the rotatable seal ring to form a mechanical face seal between the annular rotatable and non-rotatable seal faces;

wherein the non-rotatable seal ring includes an inner axial side opposite the annular non-rotatable seal face, the inner axial side forming a plurality of slots that are arranged peripherally around the inner axial side between adjacent pairs of nubs disposed on and protruding from the inner axial side in a direction away from the annular non-rotatable seal face; and wherein each of the plurality of slots abuttingly receives therein a closed end of a respective one of the plurality of resilient elements to provide an anti-rotation function between the housing and the non-rotatable seal ring.

2. The cartridge seal assembly of claim 1, wherein each of the nubs includes two peripherally disposed edges, each of the peripherally disposed edges including converging edge faces that form a chevron shape.

3. The cartridge seal assembly of claim 2, wherein the converging edge faces present tangent planes for the closed end of the respective one of the plurality of resilient elements abuttingly received therein to reduce contact stresses there between.

4. The cartridge seal assembly of claim 1, wherein two slots disposed between respective nubs are generally aligned to accommodate a disk cutter that is applied eccentrically along a chord relative to the inner axial side of the non-rotatable seal ring to cut two peripherally across sections of the inner axial side at each pass during manufacture of the non-rotatable seal ring.

5. The cartridge seal assembly of claim 4, wherein the housing defines a central opening that includes a locking bore portion disposed adjacent an end portion of the housing, and a receiver bore portion disposed adjacent the locking bore portion, wherein the receiver bore portion includes a plurality of receiver bores arranged around its inner periphery, each of the plurality of receiver bores containing one of the plurality of resilient elements.

6. The cartridge seal assembly of claim 5, wherein the plurality of receiver bores is arranged symmetrically around a periphery of the central opening of the housing, and wherein each of the plurality of receiver bores is a bore that extends parallel to a centerline of the central opening at an offset distance therefrom along a body of the housing.

7. The cartridge seal assembly of claim 6, wherein each of the plurality of receiver bores has a partially blocked blind end on an outer side of the housing facing the non-rotatable seal ring, and wherein the resilient elements are disposed radially offset in a radially outward direction relative to the inner axial side.

8. The cartridge seal assembly of claim 1, wherein each of the plurality of resilient elements includes a spring that is at least partially disposed within a cup through an open end of the cup, the cup having a closed end that at least partially abuts the non-rotatable seal ring.

9. The cartridge seal assembly of claim 1, wherein each cup is slidably disposed within the housing.

10. The cartridge seal assembly of claim 9, wherein the closed end of the cup includes an opening adapted to provide fluid pressure equalization during operation.

11. The cartridge seal assembly of claim 1, wherein the rotatable seal ring is generally ring shaped and includes a central opening through which a portion of the shaft sleeve passes.

12. The cartridge seal assembly of claim 11, further including a contoured driven portion formed along a portion of a radially inner portion of the rotatable seal ring, the contoured driven portion drivably engaging a corresponding contoured drive portion formed along an outer periphery of the end of the shaft sleeve.

13. The cartridge seal assembly of claim 12, wherein the contoured driven portion includes alternatingly concave and convex surfaces such that an inner contour thereof radially undulates inwardly and outwardly and includes a series of repeating arches peripherally around an inner portion of the rotatable seal ring.

14. The cartridge seal assembly of claim 13, wherein the contoured driven portion includes convex peaks that extend radially inwardly and concave valleys that extend radially outwardly in alternating fashion.

15. The cartridge seal assembly of claim 12, wherein the contoured driven portion meshes or drivingly engages the contoured drive portion, and wherein the contoured drive portion generally matingly matches a shape of the contoured driven portion.

16. A method for operating a cartridge seal assembly that is disposable between a rotatable shaft and a non-rotating machine component, the method comprising:

providing a shaft sleeve on the rotatable shaft, the shaft sleeve rotatably extends through a housing mounted onto the non-rotating machine component, the shaft sleeve being adapted to be securable in co-rotating fashion onto the rotatable shaft;

providing a rotatable seal ring disposed in co-rotating fashion onto an end of the shaft sleeve, the rotatable seal ring being rotatable with the rotatable shaft and the shaft sleeve in unison during operation, wherein the rotatable seal ring includes an annular rotatable seal face;

providing a non-rotatable seal ring being slidably and sealably disposed in the housing, the non-rotatable seal ring including an annular non-rotatable seal face that is biased in sealing and sliding contact with the annular rotatable seal face during operation;

providing a plurality of resilient elements disposed in the housing between a stop surface and the non-rotatable seal ring, wherein the plurality of resilient elements are disposed to provide a biasing force to urge the non-rotatable seal ring towards the rotatable seal ring to form a mechanical face seal between the annular rotatable and non-rotatable seal faces;

wherein the non-rotatable seal ring includes an inner axial side opposite the annular non-rotatable seal face, the inner axial side forming a plurality of slots that are arranged peripherally around the inner axial side between adjacent pairs of nubs disposed on and protruding from the inner axial side in a direction away from the annular non-rotatable seal face; and wherein each of the plurality of slots abuttingly receives therein a closed end of a respective one of the plurality of resilient elements to provide an anti-rotation function between the housing and the non-rotatable seal ring.

17. The method of claim 16, wherein each of the nubs includes two peripherally disposed edges, each of the peripherally disposed edges including converging edge faces that form a chevron shape.

18. The method of claim 17, wherein the converging edge faces present tangent planes for the closed end of the respective one of the plurality of resilient elements abuttingly received therein to reduce contact stresses therebetween.

19. The method of claim 16, wherein two slots disposed between respective nubs are generally aligned to accommodate a disk cutter that is applied eccentrically along a chord relative to the inner axial side of the non-rotatable seal ring to cut two peripherally across sections of the inner axial side at each pass during manufacture of the non-rotatable seal ring.

* * * * *